March 24, 1970   C. D. CHRISTIE   3,502,177
FILTER MECHANISM FOR TWO-SPEED AXLE
Filed Oct. 18, 1967   2 Sheets-Sheet 1

INVENTOR.
CHESTER D. CHRISTIE
BY
Woodhams, Blanchard & Flynn
ATTORNEYS

March 24, 1970   C. D. CHRISTIE   3,502,177
FILTER MECHANISM FOR TWO-SPEED AXLE
Filed Oct. 18, 1967   2 Sheets-Sheet 2

INVENTOR.
CHESTER D. CHRISTIE
BY
Woodhams, Blanchard & Flynn
ATTORNEYS

United States Patent Office 3,502,177
Patented Mar. 24, 1970

3,502,177
FILTER MECHANISM FOR TWO-SPEED AXLE
Chester D. Christie, Shaker Heights, Ohio, assignor to Eaton Yale & Towne Inc., Cleveland, Ohio, a corporation of Ohio
Filed Oct. 18, 1967, Ser. No. 676,339
Int. Cl. F01m 1/00; F01n 17/06, 29/00
U.S. Cl. 184—11                                                13 Claims

ABSTRACT OF THE DISCLOSURE

A differential having a lubricant pick-up and filter apparatus in which lubricant is withdrawn from a sump by a drum coupled to a ring gear and caused to flow by centrifugal force through openings in the rim of said drum to the exterior thereof. A filter is provided inside the drum across said openings for removing impurities from the lubricant. The lubricant is then returned to the sump or further circulated as desired.

FIELD OF THE INVENTION

This invention relates to an apparatus for filtering the lubricant in a differential for a single or multispeed axle and, more particularly, relates to a lubricant pick-up and filter apparatus coupled to the ring gear of a differential of an automotive drive axle.

DESCRIPTION OF THE PRIOR ART

In order to lubricate the moving parts of differentials, such as those used in automotive drive axles, the differential housing is usually provided with a lubricant reservoir therein and the ring gear and the casing of the differential move through the lubricant reservoir and pick up lubricant therefrom. This lubricant is then distributed to the parts of the differential as required. In vehicles intended for light-duty service, distribution of the lubricant can be effected merely by the splashing of the lubricant caused by the movement of the moving parts of the differential. However, in heavy-duty vehicles, such as trucks, buses, and the like, and particularly where multispeed axles are concerned, the moving parts and support surfaces of the differential of a drive axle are subjected to heavy loads and pressures. Therefore, it is necessary to insure adequate oil circulation to all parts and surfaces needing lubrication at all vehicle speeds. It has been suggested to provide forced flow lubrication of driving axles for trucks and the like, and a variety of structures have been suggested for this purpose. In other lubricating means, the lubricant is picked up on a drum which rotates with the ring gear and the lubricant is removed from the drum and is directed into conduits leading to the bearings or other parts requiring lubrication. One particularly satisfactory lubrication system of this type is illustrated in U.S. Patent No. 3,153,464.

However, residues and impurities of various types, such as metal particles, carbon particles, etc., often become present in the lubricant during the use of the vehicle. These particles continuously circulate with the lubricant during operation of the vehicle because the lubricant in the reservoir is continuously agitated by the ring gear and casing so that the particles are held in suspension therein. These particles can cause unduly rapid wear of the differential parts because of their abrasive effect or because they hinder the adequate flow of lubricant. In extreme cases, such particles can even cause failure of the differential if they collect in one place and prevent the necessary rotation of the differential parts.

While various lubricant filtering devices have been suggested, such devices are not well adapted for use in conjunction with differentials, particularly a differential in an automotive drive axle. External lubricant filtering circuits are expensive both to provide and maintain and they require space which may not be available on the truck chassis. Insofar as I am aware, it has not been suggested previously to provide a lubricant filter within a differential and which makes use of the centrifugal force developed by rotation of the ring gear for assuring circulation of the lubricant through the filter, and which can be arranged as part of a somewhat forced flow lubrication system of the differential.

Accordingly, it is an object of this invention to provide an improved differential, especially for use in an automotive drive axle or the like, and which has an internal filter arranged in the lubricant flow path so that impurities can be removed from the lubricant.

It is a further object of the invention to provide an improved differential, as aforesaid, in which the filter is arranged with respect to the ring gear of the differential so that the centrifugal force developed on the lubricant is utilized to effect flow of the lubricant through the filter.

It is a further object of this invention to provide an improved differential, as aforesaid, which can be provided with the filter at little or no increase in cost as compared with similar differentials not equipped with a lubricant filter.

It is a further object of this invention to provide an improved differential having lubricant filter means associated therewith, as aforesaid, which can also be provided with magnetic means to further improve the effectiveness of the removal of metal particles from the lubricant.

It is a further object of this invention to provide an improved differential equipped with a lubricant filter, as aforesaid, which can cooperate with existing designs of lubrication systems without substantial, if any, changes therein.

Additional objects and advantages of the invention will become apparent to persons acquainted with equipment of this type upon reading the following description and inspecting the accompanying drawings, in which:

SUMMARY

According to the invention, there is provided a differential having a lubrication system associated therewith. A lubricant filter system is associated with the differential to insure the removal of impurities from the lubricant as it circulates through the differential. The lubricant filter structure includes a drum member coupled for rotation with a suitable part of the differential, such as the ring gear, and adapted for carring lubricant to the lubrication system of the differential. The drum member has means, such as a plurality of scoops for impeling lubricant into the interior of the drum. A filter medium is positioned within the drum, across openings provided in the rim thereof, and the lubricant flows outwardly through said filter medium and said openings whereby solid particles are filtered from the lubricant, and remain on said filter medium.

DESCRIPTION OF THE PREFERRED EMBODIMENT

Figure 1:
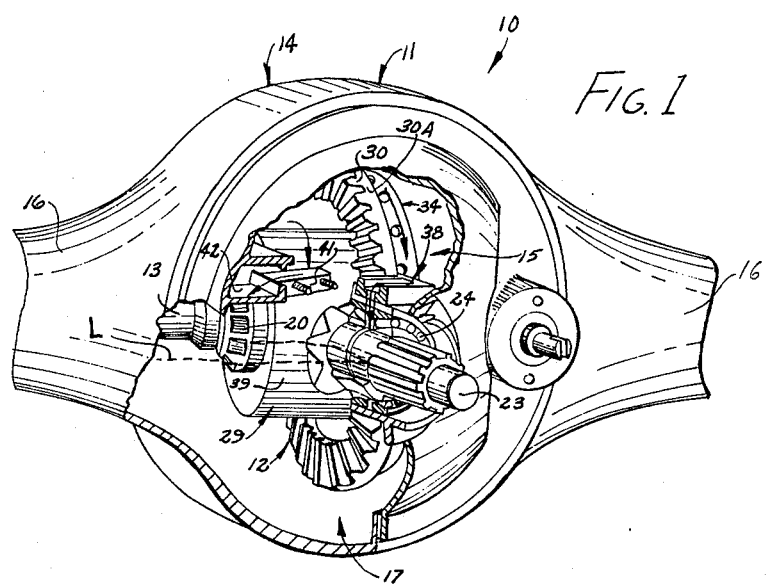
FIGURE 1 is a schematic view of a fragment of a differential equipped with a forced flow lubrication system and equipped with the improved lubricant filtering means to which the invention relates.

The accompanying drawings illustrate an automotive drive axle 10 embodying means according to the invention for filtering the lubricant for the differential region thereof. Since the invention has a broad applicability to a wide range of differential units, both single and multi-speed, it will be recognized that the particular two-speed axle here used to illustrate the invention is of known type, is selected for illustrative purposes only and is described briefly hereinafter solely to illustrate the environment in which the invention is typically applied.

In this embodiment the axle 10 comprises, in general, a housing 11 and a differential gear unit 12, here of the two-speed type, operable therein for delivering torque to traction wheels mounted on axle shafts 13 which project laterally in opposite directions from the gear unit. The housing 11 has an enlarged central portion 14 containing a gear chamber 15 in which the gear unit 12 is operable. The housing 11 also has tubular portions 16 projecting in opposite lateral directions from the central portion 14 and through which the axle shafts 13 extend. The lower portion of the gear chamber 15 provides a reservoir 17 adapted to contain a supply of lubricant for use in lubricating the various components located in said gear chamber.

The central housing portion 14 contains a pair of laterally spaced bearings 20 and 21 which support the gear unit 12 in the chamber 15 for rotation about an axis 19, which is also the axis of rotation of the axle shafts 13. The central housing portion 14 includes a projection 22 on the forward side thereof in which is located a pinion shaft 23 and a bearing 24 for rotatably supporting said pinion shaft.

The central housing portion 14 is provided with an access opening 25 on the rear side thereof, said opening 25 extending to the gear chamber 15 and providing means through which the gear unit 12 can be introduced into such chamber. A cover member 26 is removably connected with the central housing portion 14 by suitable securing screws 27A for closing the access opening 25. The cover member 26 comprises a concave wall 28 and an annular marginal flange 27 through which the screws 27A extend.

The gear unit 12 is of conventional construction and is here shown as comprising a gear case 29 containing suitable planetary gearing for transmitting torque to the axle shafts 13. The gear unit 12 also has a ring gear 30 connected with the gear case 29 and located externally thereof. The ring gear 30 is shown as being a bevel gear and the piston shaft 23 is here shown as having a bevel pinion 31 mounted thereon and disposed in meshed driving engagement with the ring gear 30. The gear unit 12 is here shown as being of the two-speed type and it has shift means 32 of known type operable to shift from one axle speed to another.

Figure 2:
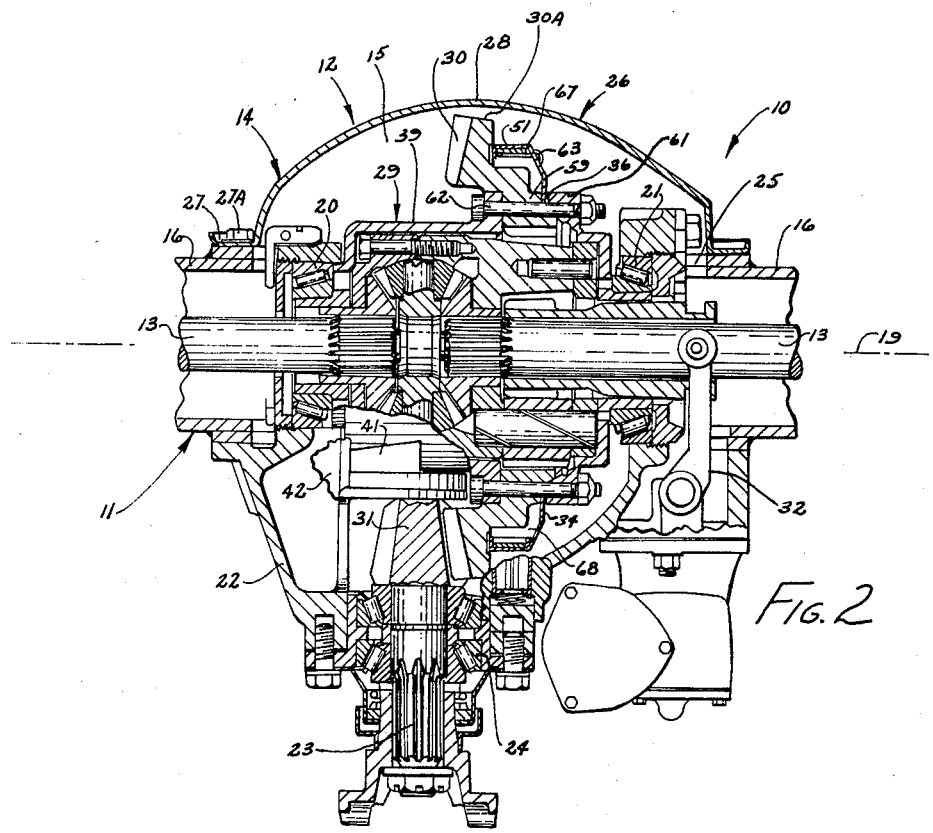
FIGURE 2 is a central horizontal sectional view of the differential.

The differential support case or carrier 29 has a cylindrical outer lubricant pick-up surface 39 which is partially immersed in the lubricant in the reservoir, the level of such lubricant being indicated by line L, and rotates therein and which is operative to pick up lubricant from the reservoir and carry the lubricant on the surface 39 as it is rotated. Lubricant carried by surface 39 is removed therefrom by a lubricant director 41 of the type shown and described in application Ser. No. 492,027, filed Oct. 1, 1965 and assigned to the same assignee as the present invention. Lubricant receiving means 42 is located immediately adjacent an end of the lubricant director 41 and leads to the bearing 20. The lubricant receiving means 42 delivers lubricant to the bearing 20 from whence it passes into and through the gear case 29 (FIGURE 2) for lubrication of the gear members therein. The lubricant then leaves the gear case 29 and passes through the bearing 21 and returns to the reservoir 17.

Further lubricant means 38 of known form are provided adjacent the periphery of the ring gear 30 for receiving lubricant from the surface 30A thereof and distributing same in any convenient manner to the bearing 24 and to such, if any, of the other moving parts of the axle mechanism as may be desired.

The foregoing is all of presently known construction but has been set forth in some detail to make clear the environment in which is located the structure comprising the invention. Turning now to the subject matter of the present invention, there is provided a drum member 34 mounted on the hub 59 of the ring gear 30 and on the side thereof opposite the teeth of the ring gear.

The drum member 34 has a peripheral wall 51 which has a series of circumferentially spaced openings 52 therethrough, said openings being usually circular. A flange 53 extends radially inwardly from one edge of the wall 51. The drum member 34 has an annular end wall 54 which extends inwardly from the other edge of the peripheral wall 51. The end wall 54 is comprised of an outer section 56 and an inner section 57. The outer section 56 is inclined with respect to the axis of rotation 19 at a relatively large angle less than 90 degrees, such as about 75 degrees. The inner section 57 extends radially inwardly and it has a series of circumferentially spaced spring fingers 58 lanced out therefrom and inclined with respect to a radial plane. The drum member 34 is mounted on the hub 59 (FIGURE 2) of the ring gear 30 and the spring fingers 58 are engaged by a retaining ring 61 which is secured to said ring gear by bolts 62.

A series of circumferentially spaced scoops 63 are provided in the outer section 56 of the end wall 54 of the drum member 34. Each scoop 63 has an end edge 64 formed by cutting through said outer section 56. A generally triangular-shaped portion 66 of the metal is displaced outwardly with respect to the remainder of the section 56 whereby the scoop 63 has a hollow, generally partially conical shape, and said scoop communicates between the interior and exterior of the drum member 34. The scoops 63 open in the direction of rotation of the ring gear 30 during forward drive of the vehicle so that as the scoops move through the lubricant reservoir 17, lubricant is caused to pass through the scoops into the interior of the drum member 34.

An annular layer 67 (FIGURE 3) of filter material is positioned against the inner surface of the peripheral wall 51 of the drum member 34 and said filter layer covers the openings 52. The lubricant which enters the interior of the drum member 34 is caused to flow outwardly by centrifugal force as the ring gear 30 and the drum member 34 rotate together. The lubricant passes through the filter layer 67 whereby residues, such as metal particles, are filtered from the lubricant and are retained on the filter layer. Thus, the lubricant exiting through the openings 52 will be substantially free of solid particles. It will be noted that the ring gear 30 and the drum member 34 define a chamber 68 (FIGURE 2) which is substantially closed and in which are retained the solid particles removed from the lubricant by the filter layer 67.

Figures 3, 4:
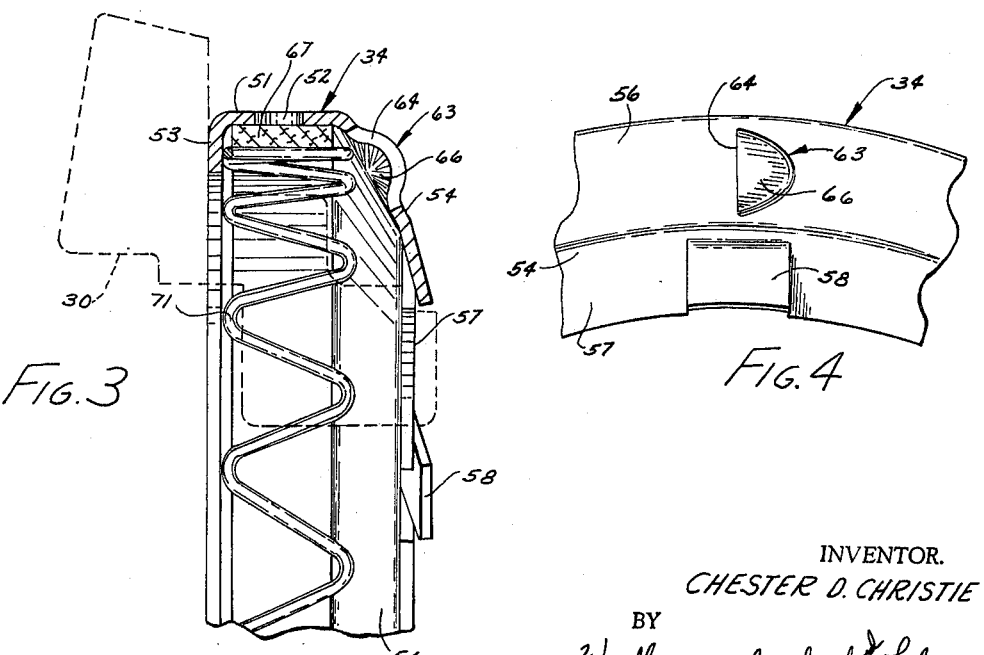
FIGURE 3 is a central-sectional view of a fragment of the drum member which is connected to the ring gear of the differential.
FIGURE 4 is a fragmentary elevation of the part shown in FIGURE 3 and viewed from the right end thereof.

The filter layer 67 can be held in place in a variety of different ways. However, a particularly preferred structure for doing this is illustrated in FIGURE 3. A spring 71 of sinuous or zig-zag configuration and arranged in the shape of an annulus is disposed between the flange 53 and wall section 56. The spring 71 engages the inner surface of the filter layer 67 and said spring tends to expand and thereby holds said filter layer snugly against the interior surface of the peripheral wall 51 of the drum member 34. The spring 71 preferably is made of a magnetic material to attract any metal particles contained in the lubricant whereby to further improve the removal of metal particles from the lubricant flowing through the interior of the drum member 34.

OPERATION

The operation of the power transmission components of the differential unit is the same as in conventional differentials and, hence, the same need not be described herein.

With respect to the lubricant flow, rotation of the ring gear 30 by the bevel pinion 31 will cause lubricant to be picked up from the lubricant reservoir. Such lubricant will be picked up both on the external surface of the ring gear 30 and the drum member 34 and also by the scoops 63 which cause lubricant to enter the interior of said drum member. The lubricant entering the interior of the drum member 34 will flow radially outwardly because of the centrifugal force acting thereon and it will move through the filter layer 67 then through the openings 52 and thence onto the exterior surface of the drum member 34. If the lubricant flowing through the interior of the drum member 34 contains any solid particles, the same will be retained on the filter 67 and will be prevented from flowing through the lubrication circuit of the differential. Although not all of the lubricant continuously flows through the filter layer 67, there is a continuous flow of a substantial portion of the lubricant through said filtering layer. As a result, the lubricant is maintained substantially free of particles which could otherwise cause damage or unduly rapid wear of the differential parts.

Lubricant exiting through the openings 52 then returns to the reservoir 17 for circulation in whatever manner is provided, here by being picked up on surfaces 30A and 39 for distribution as above described.

Replacement of the filter unit 67 is needed only infrequently and can be carried out easily at the time of any general overhaul of the running gear of the vehicle concerned.

Figure 5:
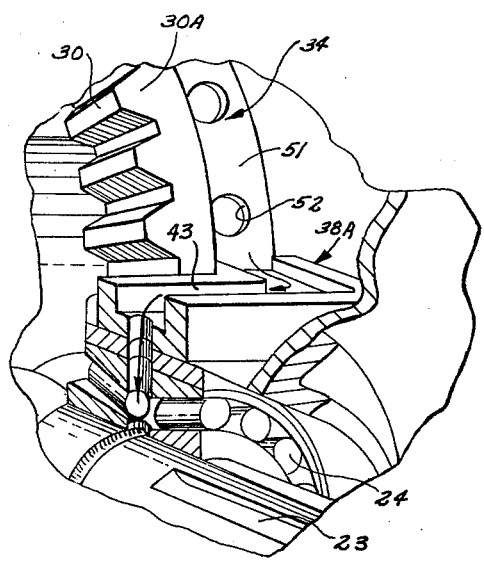
FIGURE 5 is an enlarged view similar to a portion of FIGURE 1 and illustrating a modification thereof.

If desired, means such as the scraper 38A (FIGURE 5) could also be arranged adjacent the outer surface of the drum 34 for receiving freshly filtered lubricant therefrom and delivering same to appropriate distribution means 43 for lubrication of the bearing 24.

The embodiments of the invention in which an exclusive property or privilege is claimed are defined as follows:

1. A differential having a lubricant reservoir and means for effecting flow of lubricant to parts of the differential, the improvement in a filtering device for the lubricant which comprises filter means and lubricant circulating means rotatable in response to driving of the differential parts and including a pick-up member having means to introduce lubricant to the interior thereof, passage means extending from the interior to the exterior of said pick-up member, said filter means being positioned adjacent said circulating means and extending across said passage means whereby said circulating means effects unidirectional flow of lubricant through said filter means in response to centrifugal force.

2. In a differential having a lubricant reservoir and means for effecting flow of lubricant to parts of the differential, the improvement in a filtering device for the lubricant which comprises filter means and lubricant circulating means operable in response to driving of the differential parts for circulating lubricant unidirectionally through said filter means and then supplying same to said differential parts, said lubricant circulating means including a member rotatable in response to driving of the differential parts, and said filter means being fixedly interconnected to said member for rotation therewith whereby said circulating means effects flow of lubricant unidirectionally through said filter means in response to centrifugal force.

3. A differential according to claim 2, including magnetic means associated with said filter means for removing metal particles from said lubricant.

4. In a differential having a lubricant reservoir and means for effecting flow of lubricant to parts of the differential, the improvement in a filtering device for the lubricant which comprises filter means and lubricant circulating means rotatable in response to driving of the differential parts and including an annular member having means to introduce lubricant to the interior thereof, said filter means being arranged annularly of said circulating means, passage means extending from the interior to the exterior of said annular member with said filter means extending across said passage means whereby said circulating means effects a radial outward flow of lubricant through said filter means in response to centrifugal force and means supplying the filtered lubricant to said differential parts.

5. A differential according to claim 4, in which lubricant receiving means is arranged in cooperative relationship with the exterior surface of said annular member and arranged for removing lubricant therefrom and directing the lubricant to said differential parts.

6. In a differential having a housing defining a gear chamber and a lubricant reservoir, a drive pinion, a ring gear in said gear chamber and driven by said pinion, a differential gear unit driven by said ring gear and shafts driven by said differential gear unit, and means for supplying lubricant to the differential parts, the improvement in a filtering device for the lubricant which comprises a drum member coupled to said ring gear for rotation therewith and being movable through said lubricant reservoir, means for supplying lubricant to the interior of said drum member as it moves through said lubricant reservoir, passage means extending from the interior to the exterior of said drum member and filter means extending across said passage means for filtering particles from the lubricant.

7. A differential according to claim 6, including lubricant receiving means disposed outside of and adjacent said drum member and extending into close proximity to the external surface of said drum member for removing lubricant therefrom and lubricant flow passages leading from said receiving means to the parts to be lubricated.

8. A differential according to claim 6, in which said filter means comprises an annular filter layer disposed within said drum member and lying against the interior surface of the peripheral wall thereof.

9. A differential according to claim 8, including spring means for retaining said filter layer within said drum member and resiliently urging same against said interior surface.

10. A differential according to claim 9, in which said spring means is of substantially sinuous configuration and is arranged in an annular shape.

11. A differential according to claim 6, in which said drum member has an inwardly extending end wall, said end wall having scoops provided thereon for directing fluid into the interior of said drum.

12. A differential according to claim 6, in which said drum member is fixedly secured to said ring gear and defines therewith a substantially closed chamber in which said filter means is disposed.

13. A differential according to claim 9, wherein said spring means is made of a magnetic material to attract any metal particles contained in said lubricant.

(References on following page)

References Cited

UNITED STATES PATENTS

| | | | |
|---|---|---|---|
| 1,386,154 | 8/1921 | Brush | 184—6 |
| 1,631,594 | 6/1927 | Kaegi | 184—11 |
| 2,242,195 | 5/1941 | Teker et al. | 184—11 |
| 2,307,954 | 1/1943 | Radke. | |
| 2,356,953 | 8/1944 | Snow | 184—13 |
| 3,153,464 | 10/1964 | Nelson et al. | 184—6 |
| 3,182,527 | 5/1965 | Bryan | 184—11 XR |

FOREIGN PATENTS

| | | |
|---|---|---|
| 850,030 | 9/1960 | Great Britain. |
| 1,007,491 | 10/1965 | Great Britain. |

FRED C. MATTERN, Jr., Primary Examiner

M. A. ANTONAKAS, Assistant Examiner

U.S. Cl. X.R.

184—6